United States Patent [19]

Street et al.

[11] Patent Number: 5,069,160

[45] Date of Patent: Dec. 3, 1991

[54] AUTOMATIC MILKING OF ANIMALS

[75] Inventors: Michael J. Street, Bedford; John A. Benson, Wootton; John A. Marchant, Bedford; Arthur L. Wilkin, Hitchin; Clive J. Allen, Bracknell, all of England

[73] Assignee: National Research Development Corporation, London, England

[21] Appl. No.: 462,530

[22] Filed: Jan. 3, 1990

[30] Foreign Application Priority Data

Jan. 4, 1989 [GB] United Kingdom ................ 8900084

[51] Int. Cl.$^5$ ................................................. A01J 7/00
[52] U.S. Cl. .................................. 119/14.08; 119/14.1
[58] Field of Search ................ 119/14.03, 14.08, 14.1, 119/14.18

[56] References Cited

U.S. PATENT DOCUMENTS

| | | | |
|---|---|---|---|
| 4,010,714 | 3/1977 | Notsuki et al. ................ | 119/14.03 |
| 4,508,058 | 4/1985 | Jakobson et al. ............. | 119/14.02 |
| 4,685,422 | 8/1987 | Middel et al. ................. | 119/14.08 X |
| 4,805,557 | 2/1989 | van der Lely et al. ....... | 119/14.18 X |
| 4,838,207 | 6/1989 | Bom et al. ..................... | 119/14.14 X |
| 4,941,433 | 7/1990 | Hanauer ........................ | 119/14.1 X |

Primary Examiner—Robert P. Swiatek
Attorney, Agent, or Firm—Cushman, Darby & Cushman

[57] ABSTRACT

An arrangement to apply a milking apparatus to the udder of an animal at a milking point including a store for the apparatus, a handling device having an elongate arm to support and move the apparatus between an apparatus acquisition point and the milking point, a stall to define a specific space for an animal to be milked fixedly related to the acquisition point and the milking point, including guides to retain loosely in the space an animal to be milked, sensors to sense retained animal position with respect to the fixedly related space and points and provide a first signal indicative of sensed animal position, pneumatic elements in the device to swing and to longitudinally displace the elongate arm to move and position the elongate arm and any supported apparatus, and control circuitry to control the pneumatic elements to operate the arm to acquire milking apparatus at a position forward of the teats of a retained animal, the control circuitry being responsive to the first signal to move the acquired apparatus rearwardly under the animal to the milking point for application to a respective teat of a retained animal, the arrangement further including in association with the acquired apparatus localized teat sensors to provide a second signal indicative of sensed teat position relative to the acquired apparatus, the control circuitry being responsive also to the second signal to control the pneumatic elements for application of the acquired apparatus to a respective teat, the movement of the arm by the response of the control circuitry to the second signal being localized with respect to the response to the first signal to enable a teat cup of the apparatus to be applied to a teat.

15 Claims, 9 Drawing Sheets

AUTOMATIC MILKING OF ANIMALS

This invention relates to the milking of cows and like animals.

In recent years attempts have been made to mechanise the traditional milking techniques. The extraction of milk with a vacuum teat cup and the release of the teat cup by mechanical means are now well-established. However the placing of the teat cups on the teats has proved less easy to mechanise. There are various reasons for this. The animal can not be held completely still and there are considerable variations in the size and shape of the udder, and thus teat position, both from one animal to another and for one animal from time to time.

Among publications relating to the automatic placing of the teat cup are the following:
1. Dutch Patent Application 8304498 by Gascoigne-Meiotte, published inter alia as WO 85/02973 on PCT/NL84/00044,
2. Russian Inventors Certificate (Patent) 3009711/30-15 of 1980, published as 935021, inventors Kosa and Betin,
3. Japanese Patent Applications 49-26844 and 49-26845 (1974) by Notsuki et al, published inter alia as U.S. Pat. No. 4010714,
4. Il Latte (1984) 9,206–218. An article by V. Parenti Castelli and G. Vassura,
5. J. Agric.Eng.Res. (1984) 30,65–70, an article by D. Ordolff,
6. Swedish Patent Application 8202278, published inter alia as U.S. Pat. No. 4508058 and EP-A-0091892, inventors Jakobson and Rabold, assigned to Alfa-Laval,
7. German Patentschrift (DD) 217971 A1, Akademie der Landwirtschaft der DDR.
8. European Patent Application 87 200043.5 by C. van der Lely N.V., published inter alia as EP-A-0229682,
9. Farmers Weekly, Jan. 24th and 31st, 1986, IMAG/-Vicon.
10. The Sunday Telegraph, London, July 28th, 1985.
11. French Patent Application 86 03264, published as FR-A-2595197, and European Patent Application 87 402000.1, published as EP-A-0306579, both by CEMAGREF.

These publications disclose equipment which applies varying degrees of restraint to the animal to be milked and then applies the teat cups to the udder after driving the cups to a memorised position by devices on the cluster or by causing the teat cups to "home-in" to the udder by various sensing devices on the cluster.

These publications also refer to the advantages of milking several times in each 24 hour period rather than the traditional approach of milking all the animals twice in 24 hours at set times.

However all the proposals require complicated and sensitive devices some of which have to be on the cluster. These devices are delicate and not really appropriate for the harsh environment of a farm, being easily damaged and requiring skilled maintenance.

Furthermore some of the proposals are likely to be unacceptable because of the risk of contamination while others could cause discomfort to the animal, which could reduce yield.

It is an object of the invention to provide a milking apparatus application technique which is robust and effective in the environment in which animals are kept.

According to the invention there is provided an arrangement to apply a milking apparatus to the udder of an animal at a milking point including a store for said apparatus, a handling device having an elongate arm to support and move the apparatus between an apparatus acquisition point and the milking point, means to define a specific space for an animal to be milked fixedly related to the acquisition point and the milking point, the arrangement including means to retain loosely in said space an animal to be milked, means to sense retained animal position with respect to the fixedly related space and points and provide a first signal indicative of sensed animal position, pneumatic means in said device to swing and to longitudinally displace said elongate arm to move and position said elongate arm and any supported apparatus, and control means to control said pneumatic means to operate said arm to acquire milking apparatus at a position forward of the teats of a retained animal, said control means being responsive to said first signal to move said acquired apparatus rearwardly under the animal to said milking point for application to a respective teat of a retained animal, the arrangement further including in association with said acquired apparatus localised teat sensing means to provide a second signal indicative of sensed teat position relative to said acquired apparatus, the control means being responsive also to said second signal to control said pneumatic means for application of said acquired apparatus to a respective teat, the movement of the arm by the response of said control means to the second signal being localised with respect to the response to the first signal to enable a teat cup of said apparatus to be applied to a teat.

The milking apparatus may have a single teat cup or several teat cups.

The milking apparatus may include a positioner for each teat cup, each positioner including a pneumatic actuator operable to hold a teat cup already positioned with respect to the positioner or to release the teat cup. A teat cup may be provided with a support means including a pneumatic device operable to hold a teat cup body already positioned with respect to the support or to release the body in the support. The teat cup support means may be coupled to the positioner to be held or released by said positioner actuator. The apparatus may include drive means to allow the apparatus to revert, at least partially under gravity, to a defined relaxation position where each teat cup sets to a zero position or be driven from the defined relaxation position to an operating position with each teat cup set to zero ready for setting to a said relationship.

The pneumatic device may be an assembly of relatively movable elements pivotted for movement by pneumatic actuators to produce movement of the milking apparatus and to drive the device with respect to a teat to apply a teat cup.

According to the invention there is also provided a method of applying a milking apparatus to the udder of an animal including:
providing an adjustable pneumatic milking apparatus support device,
positioning forwardly of the device said milking apparatus,
positioning alongside the device and the milking apparatus an animal to be milked,
loosely restraining said animal,
acquiring the milking apparatus with the device, moving the acquired milking apparatus supported on the device under the animal to approach the front of the udder for the application of the milking apparatus.

Embodiments of the invention will now be described with reference to the accompanying drawings in which:

FIGS. 2a, 2b and 3 show details of elements of FIG. 1, FIGS. 4 and 5 show respectively in side elevation and partial plan a manipulator on which the apparatus of FIG. 1 is mounted, FIGS. 6.1, 6.2, 6.3, 6.4 and 6.5 show in schematic form stages in the movement of a cluster (which may have one or more teat cups) by a manipulator.

Figure 1:
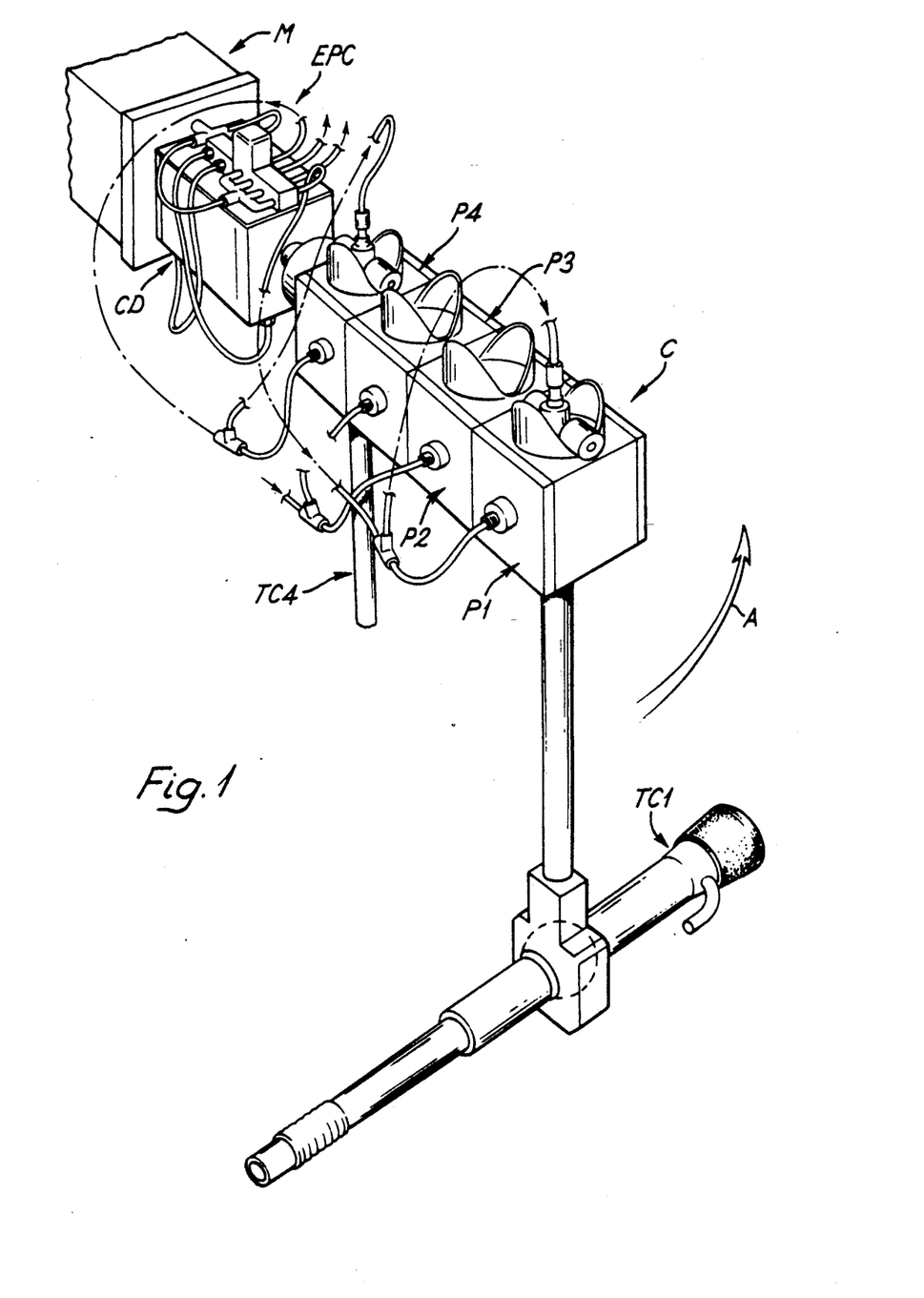
FIG. 1 shows a perspective view of a milking apparatus cluster (part omitted for clarity)
Figures 2A, 2B:
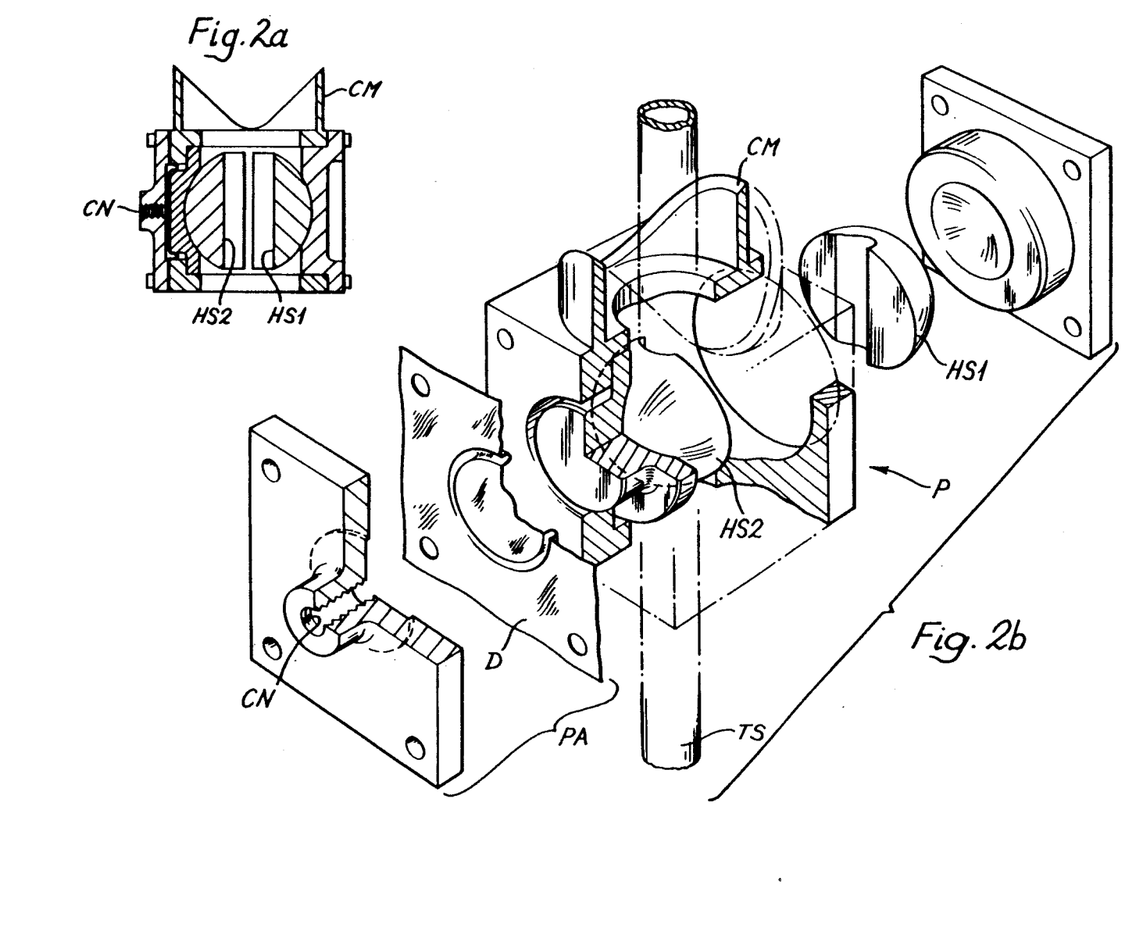
Figure 3:
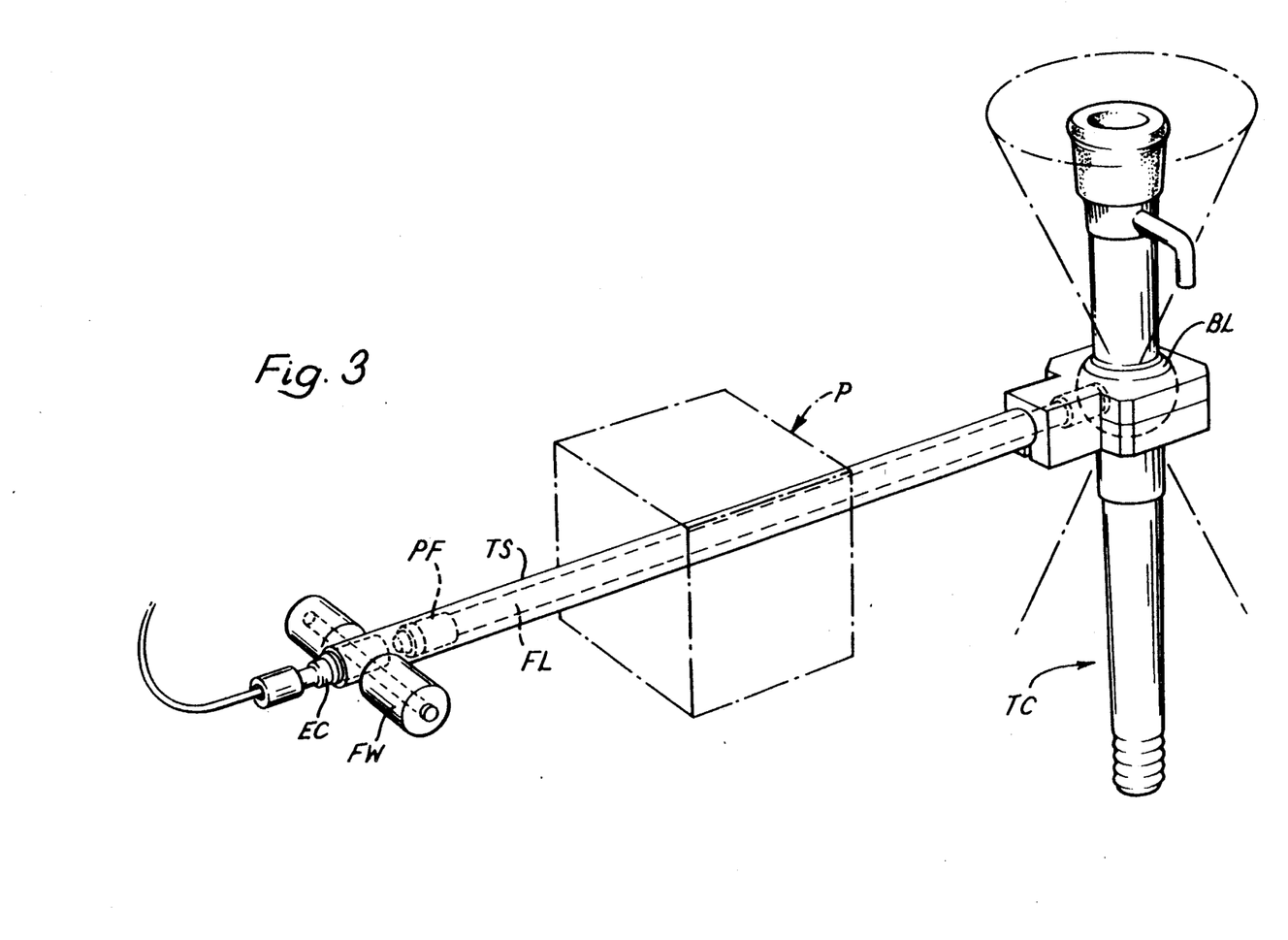

Attention is directed initially to FIGS. 1 to 3 in which a milking cluster C for four teat cups is shown. The term cluster used herein generally refers to four teat cups but fewer than four cups may be used in some embodiments. Reference M indicates the manipulator on which the cluster C is carried. Unit CD is a cluster driver by which the cluster is driven with respect to the manipulator. Units P1, P2, P3 and P4 are individual positioner devices which operate on respective teat cups TC1, TC2, TC3, TC4 (only TC1 and part of TC4 being shown). An exemplary positioner device P is shown in an exploded view in FIG. 2 and an exemplary teat cup TC in part phantom view in FIG. 3. An electropneumatic controller EPC is supplied with compressed air and electrical control signals via connections inside the manipulator M to control the selective application of compressed air over the various air lines AL to the positioners and teat cup stems. The conventional vacuum supplies, for example via a cluster claw, are also provided for the teat cups but are not shown here being well-known to those skilled in the art. In particular a separate milk tube for each teat cup is a convenient arrangement. As mentioned above the term cluster used herein generally refers to four teat cups but fewer than four cups may be used in some embodiments. In certain circumstances it may be more efficient to apply only two cups, or even one cup, at a time.

It is important to consider the total balance of cost and time. While it may take longer to milk an animal when only two quarters are milked at a time the overall economic balance can be favourable to this regime for several reasons. The machine can be simpler and cheaper. If the front and rear quarters have different milk yields, then a different pattern of milking can be adopted and the animal may prefer this and produce a better overall yield, while it is not necessary to continue to milk empty quarters while milk is removed from others. Also milk from each quarter can be measured and checked to improve monitoring of yield and animal health.

In outline the electropneumatic controller EPC is operable to cause the cluster driver CD to rotate to drive the cluster C from the position shown in FIG. 1, which is a relaxation position, through a right angle in the sense of arrow A, to the operative position where the cluster C is held ready for setting and use until, after use, the controller EPC allows the cluster to revert, under gravity at least in part, to the relaxation position. The controller is further operable, in a selective manner, to operate the positioners P1 to P4 and teat cups TC1 to TC4 when the cluster is in the operative position. FIGS. 6.1, 6.2, 6.3 are briefly referred to here as part of an initial overview.

Figure 61:
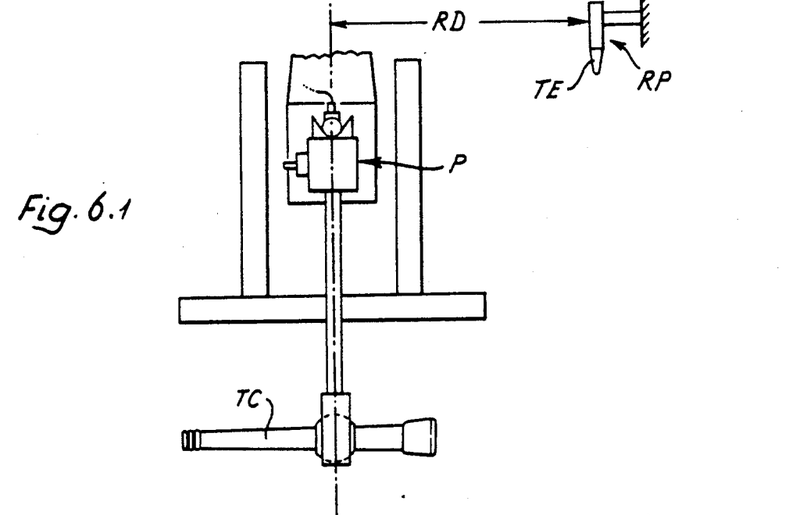
Figure 62:
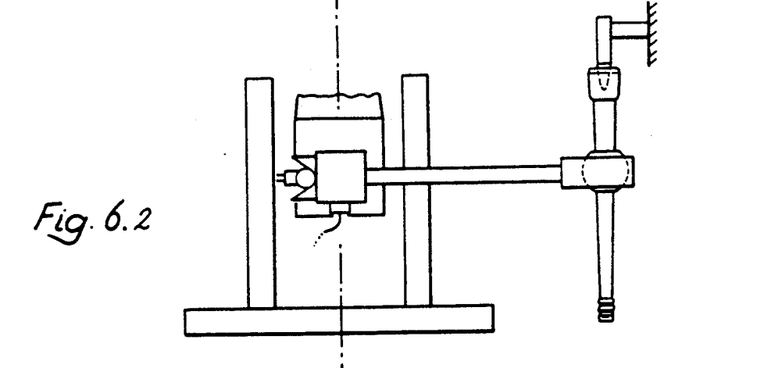

FIG. 6.1 corresponds to the FIG. 1 relaxation position of the cluster attained under gravity with the teat cups generally indicated at TC freely hung from the positioners, generally indicated at P, at a known displacement RD from a fixed reference point RP. Conveniently RD is set so that when the cluster is driven to the operative position, as shown in FIG. 6.2, one teat cup is engaged with an element TE at the reference point. The element TE can be of various forms. A grip or socket can hold the teat cup or a teat-like element fit into the cup. Also the teat cup can be washed at this position.

Figure 63:
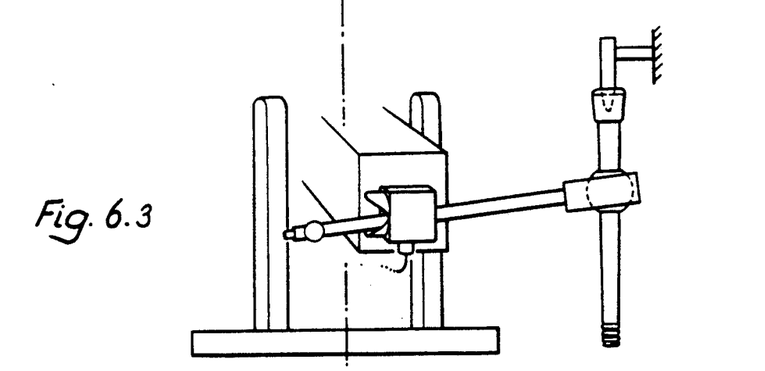

With the teat cup engaged with the element TE and therefore fixed in position the hold by the positioner and on the teat cup stem is loosened and the manipulator M moved until a particular setting of the teat cup with respect to the manipulator is achieved (FIG. 6.3) when the hold of the positioner is again applied to fix the teat cup setting. The manipulator can then be operated to disengage the teat cup from the element TE. In certain circumstances some at least of the setting action could be done by moving the reference point once the cup is held on it.

Each teat cup of the apparatus, that is one to four, can be set in this way to produce a cup or cups ready to fit onto the udder of a specific cow, the position of whose teats is known or predicted. When milking is finished the teat cups are released from the udder in the usual way and moved away by the manipulator. Before release from the udder at the end of milking the shape of the udder and the teat positions can be assessed by again releasing the hold by the positioners and on the teat cup stems to allow the teat cups to conform to the udder shape and reapplying the hold. By various means, e.g. noting the movement of the manipulator to place a teat cup again on the element TE or spatial sensing using, for example, ultrasonic devices on the teat cup or cluster, a set of measurements can be made. If the manipulator has been allowed to go slack (see below) it may be necessary to re-establish a reference for these measurements.

Figure 4:
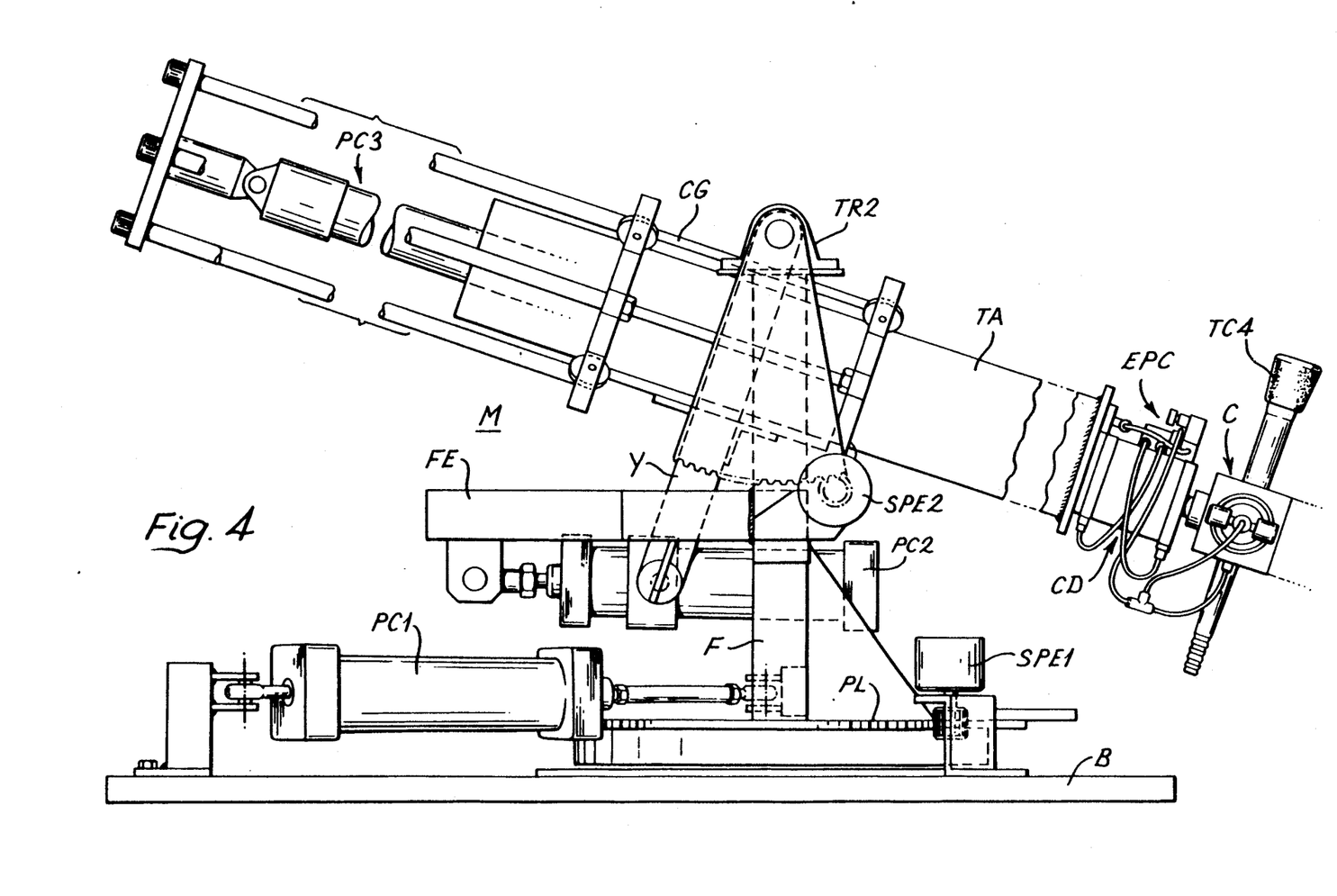
Figure 5:
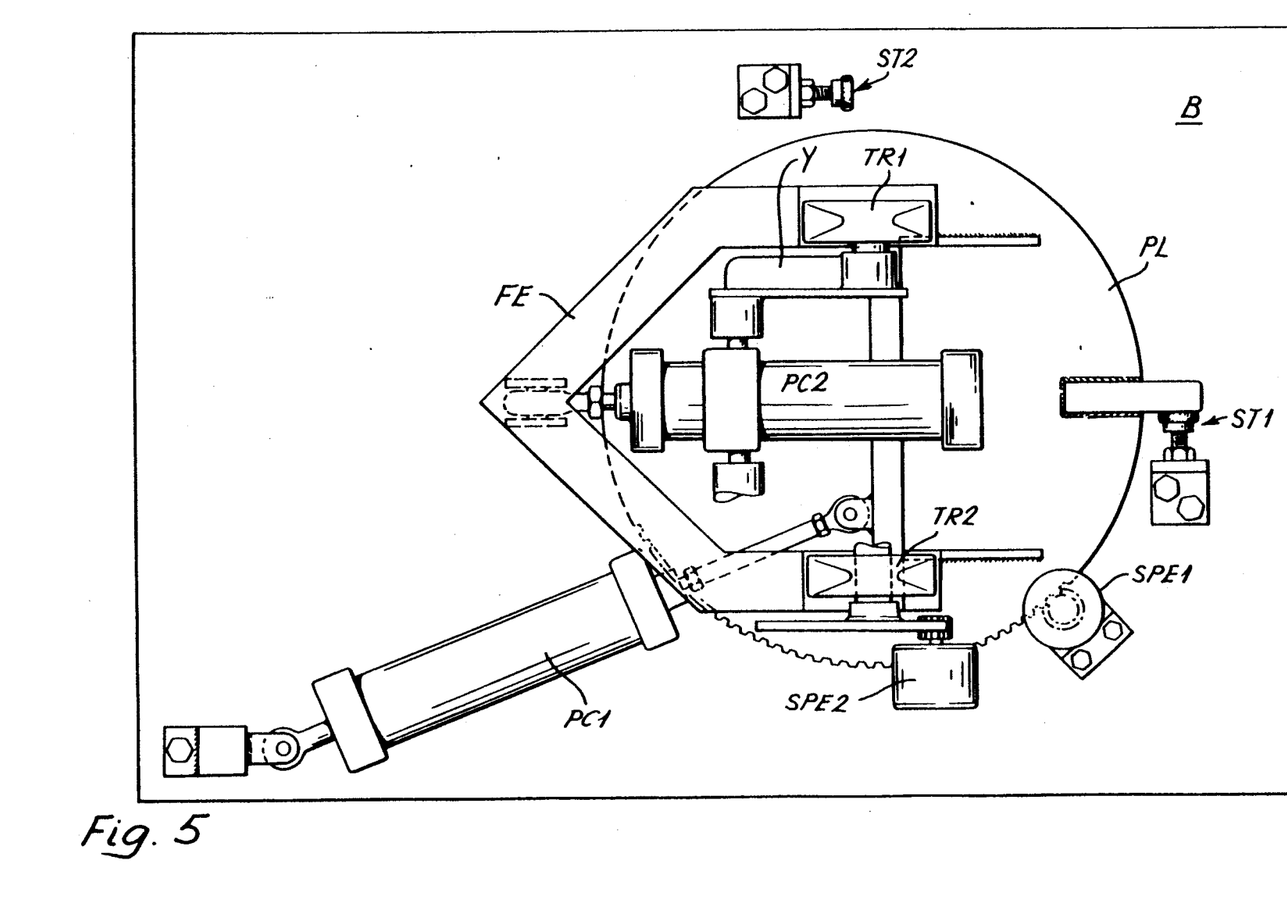
Figure 64:
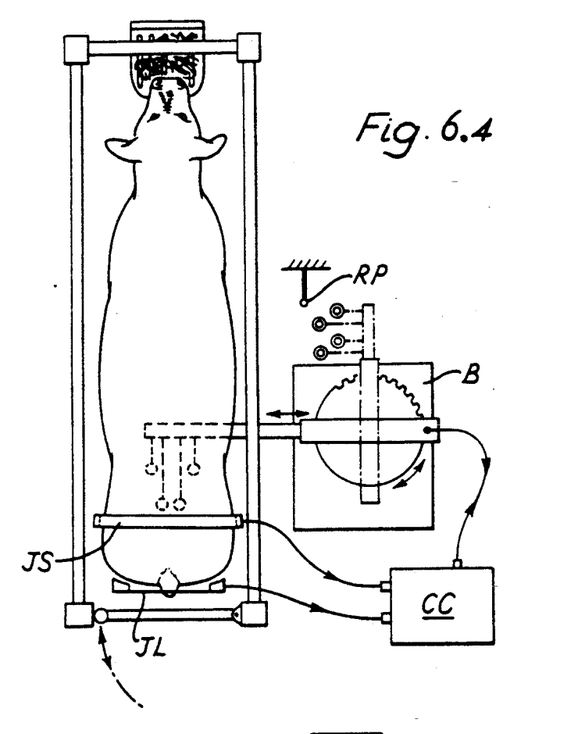

Turning now to FIGS. 4 and 5 these show in side elevation and partial plan a manipulator to support and move the cluster in an appropriate manner to set the teat cups and move them to the udder. The manipulator is pneumatically operated under electrical control of the air supply and consists of baseplate B supporting a rotatable platform PL which in turn supports trunnions TR1, TR2 between which a telescopic arm TA can swing in a vertical plane. FIG. 6.4 shows how the manipulator is, in use, located next to a cattle crush, together with a suitable control arrangement CC which may as shown or elsewhere.

As shown in FIGS. 4 and 5 a substantial baseplate B is provided, this is securable to the floor or other structure to provide a solid support for the manipulator motion. A circular platform PL is pivotted in any suitable manner on baseplate B, for example a substantial ball-race. A first pneumatic cylinder, PC1, extends from a mounting on the baseplate to a mounting on platform PL, being connected by swivel joints to enable the cylinder PC1 to rotate the platform PL on expansion and contraction of the cylinder. The rotation is limited to a right angle by stops ST1, ST2 on the base cooperating with an extension on the platform. The rotation is monitored by a shaft position encoder SPE1 coupled to the platform by an arcuate rack and pinion arrangement. Pneumatic cylinder PC1 is advantageously formed of two piston and cylinder arrangements in tandem, not shown in detail. A first, coarse adjustment, piston and cylinder rotates the platform PL to the approximate position required. A second, fine adjustment, piston and cylinder is then brought into use to bring the platform to an exact position. By arranging the second piston and cylinder with very short pneumatic connections to the closely positioned control valves, an exact position is quickly achieved, the volume of air to be moved being minimised.

A framework F is rigidly attached to the platform, standing up from it to provide a horizontal frame extension FE and support for trunnions TR1, TR2. A yoke Y is pivotted in the trunnions and supports a cage CG in which the telescopic arm TA is housed and moved. A second pneumatic cylinder PC2 is connected between the frame extension FE and yoke Y to drive the yoke to and fro with respect to the frame F and thereby swing the yoke and cage in the trunnions to move the telescopic arm in the vertical plane. The motion of the yoke is monitored by a shaft position encoder SPE2 coupled to the yoke by an arcuate rack and pinion arrangement.

The telescopic arm TA is movable in cage CG by a third pneumatic cylinder PC3 housed inside the arm on the lengthwise axis and fixed to the cage at one end and to the arm at the other. The cage conveniently provides a low-friction rolling support for the movable arm by means of V-section wheels of acetal copolymer material diagonally inclined in the cage.

The various pneumatic cylinders are supplied with compressed air under electropneumatic control, in a manner not shown, in any convenient manner. The total action of the cylinders is to permit the arm to be rotated over a right angle about a vertical axis, swung in a vertical plane through the axis and extended and retracted. All these motions permit the manipulation of the cluster, as shown schematically in FIGS. 6.1 to 6.4, to be moved to the reference point RP for the setting of the teat cups of the cluster and then swung toward the animal, conveniently held in a "crush", and depressed and extended beneath the animal during the swing to reach back towards the udder. The electrical and pneumatic supplies for the cluster are enclosed in the telescopic arm, conveniently as a coiled arrangement around a support rod.

Advantageously once the teat cups of the cluster are in place on the udder the manipulator is allowed to "relax" by removing control from the pneumatic cylinders PC1, PC2, PC3 and the controller EPC. In this way the cluster can "follow" the movement of the animal and less restraint is placed on the animal. Some air pressure can be maintained to carry some of the deadweight of the apparatus. A particular advantage of this arrangement is that no constraint need be placed on the feet of the animal. Such restraint has been required in earlier proposals.

The form of the "crush" or "crate" is conveniently a generally rectangular tubular metal frame. Desirably the "crush" can be set to suit each animal as it presents itself to ensure a good "fit" and easy constraint, without discomfort, holding the animal in an optimum position. The "crush" is of the "straight through" type, for simplicity and speed, with an entrance gate to admit an animal, and an exit gate at the animal's head end, the exit gate conveniently being fitted with a manger for controlled feed supply. Widthways constraint is applied evenly from each side to hold the animal centrally in the crate.

Sensing devices to respond to identity devices on the animals can be arranged near the entrance to the animal restraining arrangement to provide signals by which a responsive control arrangement can regulate the admission of animals, as is known in the art.

The construction and operation of the cluster C and teat cups TC will now be described in more detail with reference to the various Figures. As outlined earlier cluster driver CD supports and drives the assembly of four similar positioners P1 to P4 and teat cups TC1 to TC4. Units P1 to P4 are essentially modular with some appropriate variation, as are the teat cups.

A typical positioner P is shown in FIGS. 2a and 2b and a typical teat cup TC in FIG. 3.

Positioner P is essentially a pneumatically operated clamp of two grooved, opposed hemispheres HS1, HS2 housed in a block one face of which is a pneumatic actuator PA supplied with compressed air over connector CN (FIG. 2a). Diaphragm D of actuator PA is arranged to operate, through a follower, hemisphere HS2, to clamp on a shaft TS of teat cup TC against hemisphere HS1 butted against an opposite face of the block (FIG. 2a). When the clamping action is released the shaft of the teat cup is free to move and, when positioned as in FIG. 1, fall under gravity to a repeatable rest or zero position determined by cam CM and follower FW. Once at the zero position the shaft of the teat cup can be clamped for controlled movement to a reference point RP as explained above.

Teat cup TC has a shaft TS connecting the actual cup to follower FW. The shaft is hollow and includes at the end carrying follower FW a piston arrangement PF with an elongate follower FL extending axially the length of the shaft to a ball and socket arrangement by which the actual teat cup is held. When pneumatic pressure is applied via the end connection to the piston PF the follower F1 is moved to clamp the ball B in its socket in the orientation of the teat cup at the time.

The automatic milking art already including proposals for animal husbandry regimes of on-demand milking related to feed supply with recording of udder form and other parameters to monitor the milk production and well-being of the animals with a more uniform labour requirement than the present twice-a-day peaks, permitting more attention to animal care. Techniques for identifying an animal presenting itself for milking and determining whether or not milking is appropriate are already known and are based on control devices such as a specially-programmed small computer.

The techniques described above to milk an animal will now be summarised. When an animal presents itself and milking is appropriate the setting of the cup or cups of the cluster is readily carried out by the techniques according to the invention without the need for drives in the cluster area, which is exposed to greatest risk of damage. The actual position of the animal is not fully defined by the "crush" or other holding arrangement and suitable ranging and position-determining devices are used, for example ultrasonic sensors, to determine the position of the animal so that the set cluster can be moved to the actual position of the udder by the manipulator. Conveniently a control device of a suitably programmed small computer CC can receive information, refer to stored instructions and cause appropriate movement of the manipulator.

One convenient arrangement to follow the movement of the animal in the "crate" or "crush" is a pair of lightweight jaws JS which are supported above the animal to bear lightly on each side of the hind-quarters. The support is such that the jaws ride on and follow the movement of the animal and by sensing the position of the jaws, for example with linear potentiometers produced by Penny & Giles, the manipulator can be controlled while the teat cups approach the teats even if the animal is moving in the crate. Each jaw gives a respective signal and the output is conveniently a difference signal derived from these signals. A similar arrangement JL across the rear-end of the animal gives "lengthways" position information. The information is applied to the control device CC to operate the pneumatic elements of the manipulator. Air drive is used to give a "soft" action on the animal.

As explained above the cluster need not have four cups. Any lesser number, conveniently two, can be used. By approaching the udder from the front of the animal there is less equipment in a position where the animal can kick or contaminate it. The manipulator can be driven to enable the cluster to follow the movement of the udder on the cow but a degree of freedom is also possible because of the pneumatic device used. At the end of milking the cluster is removed in the normal way. Washing and disinfection of the udder and cluster can be carried out in any appropriate manner and time.

A further important advantage of the technique according to the invention is that the udder and teat form at the end of milking can be determined by reversing the setting action. To do this the teat cups are released in the positioners while still on the teats to be freely movable and are then clamped by the cluster pneumatics in the position set by the teats, released from the udder and transferred to the reference point for the movement of the manipulator to the zero position to measure the final position of the teats. The measuring techniques can thus be supplemented by monitoring udder and teat form with milk state, enabling the cluster to be set to fit readily onto the udder as presented at any time.

Figure 7A:
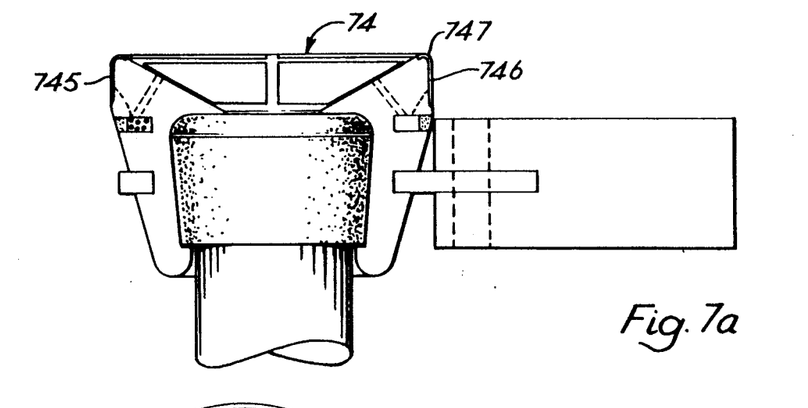
FIGS. 7a and 7b show a gripper for a teat cup.
Figure 7B:
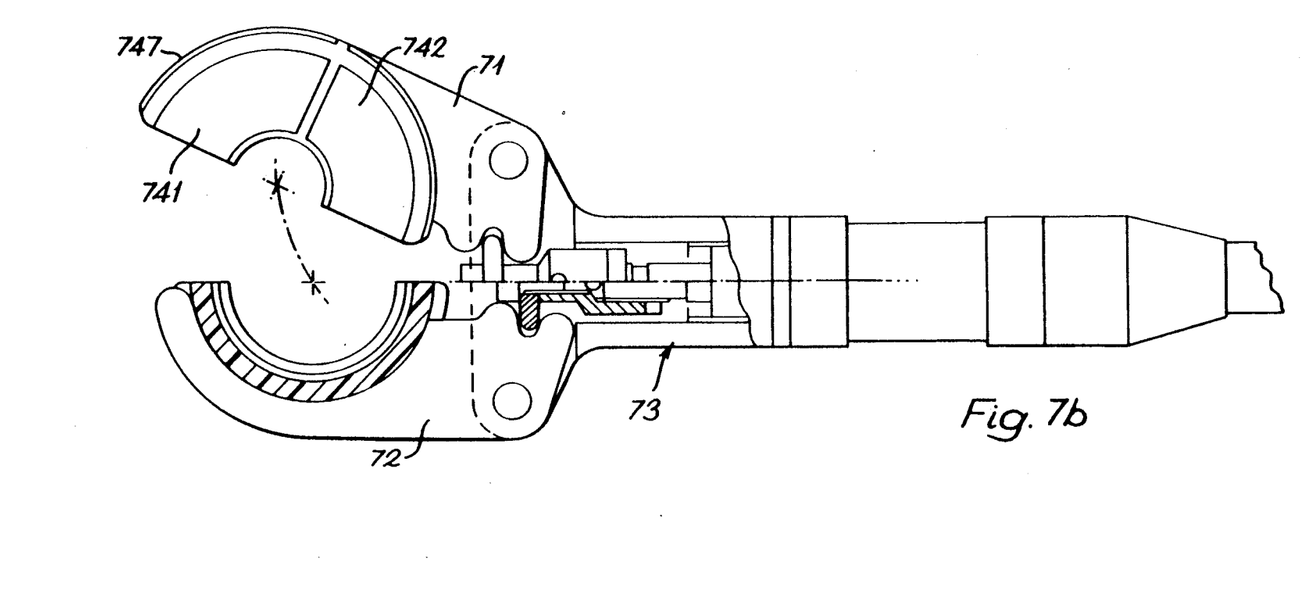

An arrangement for applying a milking apparatus of a single teat cup to the udder of a cow is shown in FIGS. 7a and 7b. The Figures show a gripper which can be carried by a suitable manipulator such as that shown in FIGS. 4 and 5. The gripper could be fitted to the end of the telescopic arm TA. In another embodiment the gripper could be fitted to an operating arm mounted alongside a milking stall.

The gripper in FIGS. 7a and 7b has jaws 71, 72 operable by a suitable electropneumatic or other means 73, not shown in detail, to grip a conventional teat cup and remove it from a magazine or other holder. Importantly the teat cup is partly enclosed by the gripper jaws to provide a funnel-like enlarged part 74 around the mouth of the teat cup. (The jaw 72 has had the funnel-like part omitted for clarity). On the part 74 are a number of sensing regions 741, 742, 745, 746. Some, 741, 742, are on the funnel-like surface. Others, 745, 746, are around it. Preferably the "rim" of the funnel-like surface has sensing regions such as 747. The number, form and position for the regions will be readily set by those skilled in the art. The sensing action may be by electrical contact between each region and a teat, by capacitance variation without contact, by material altering its electrical properties or generating electricity on pressure being applied, by inductance or any other suitable method including thermal sensors and optical or other radiation transmitting and receiving devices, which may be laser-based light-patterns projected onto the udder. The sensor regions are arranged so that as the gripper carrying a teat cup is presented to a teat a suitable means connected to the sensor regions can determine which way to move the gripper so that the teat can enter the teat cup. The teat cup is then attached by vacuum action.

Once the teat cup is attached to the teat, by the normal action of the vacuum applied to the teat cup, the gripper can release the teat cup and be used to attach another teat cup. The gripper just described can use the standard teat cup and by separating the sensing regions from the teat cup provides a robust arrangement.

The position of the gripper on the manipulator or like device is preferably set to some degree while gripping the teat cup before removing it from the holder. This reduces the actions needed in the total movement to a teat when the position is known, even only approximately. In this way the jaws carrying the teat cup can be brought near to the teat by the techniques described earlier, the sensor arrangement providing enhanced accuracy over the final approach. Although it is desirable to have as simple, light and robust apparatus as possible mounted on the end of the manipulator arm accuracy is also important. For this reason one teat cup can be equipped to sense the teat and the other cups can be applied in a predicted relationship to the first one. In particular the problem of a restless animal can be dealt with, without having to constrain it too closely. With such animals even if the information on the udder is correct so that the cluster can be set up it may not be possible to follow the udder quickly enough. The sensing region on one teat cup provides the speed of response needed.

Figure 8:
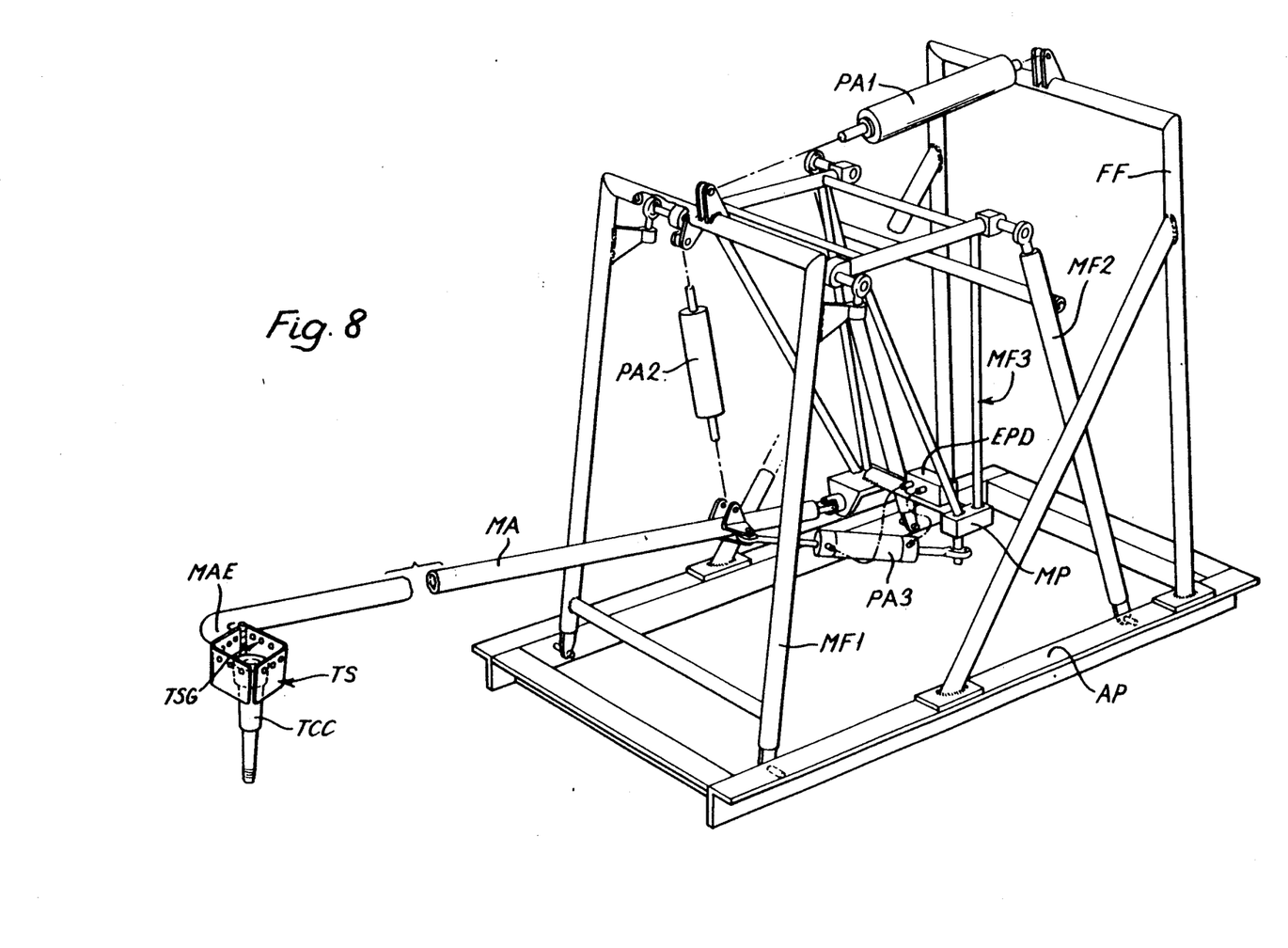
FIG. 8 shows another manipulator.

Another form of pneumatically operated manipulator to support and move a milking apparatus is shown in FIG. 8. This is a perspective view and shows a manipulator having a space-frame to support an arm on which milking apparatus is carried. The manipulator may be supported on a turntable as mentioned below. FIG. 9 shows in schematic form the movement of a teat cup by the manipulator.

As shown in FIG. 8 a platform AP supports a framework a part of which (FF) is rigidly mounted on the platform and two parts of which (MF1, MF2) are pivotally mounted on the platform. A further movable framework part (MF3) is in turn pivotally mounted on the movable parts MF1, MF2. Pneumatic actuators link the movable parts and the fixed part to control the positions of the parts. Thus actuator PA1 links the fixed part FF to the movable part MF1 to move part MF1 to-and-fro in the direction of the longer axis of platform AP. Movable part MF3 links part MF1 to part MF2 to be supported therebetween and to be moved in this to-and-fro direction. The lower end of part MF3 forms a movable platform MP which, by the movement of part MF1 by the action of actuator PA1, is caused to move in the to-and-fro direction in a substantially level path with reference to platform AF.

Movable platform MP supports via a universal joint UJ a manipulator arm MA on which the milking apparatus is supported. The manipulator arm MA is positioned by two actuators PA2, PA3. Actuator PA2 is effective between frame part MF1 and the arm MA while actuator PA3 is effective between movable platform MP and the arm MA. Movable platform MP is preferably offset to maximise the effectiveness of actuator PA3 while keeping arm MA near the centreline of the frame. Actuator PA3 is controlled from an electropneumatic converter device EPD mounted on platform MP so that connections are simplified.

It will be apparent that the outer end MAE of arm MA is movable in the above-mentioned to-and-fro direction by the action of actuator PA1 on movable part MF1 and can be swung across this direction (vertically and/or horizontally) by the appropriate actions of one or both of actuators PA2, PA3.

The outer end MAE can thus be caused to move in a controlled manner in a volume around the to-and-fro direction.

Each actuator PA1, PA2, PA3 can be provided with a suitable transducer, in known manner and either external to the actuator or integral with it, to permit repeatable movement of outer end MAE, and milking apparatus thereon, to specific positions in the volume around the to-and-fro direction. The volumes of the actuators are made small to improve the response of the system.

The actuators thus provide a cascade of controlled movement by which a milking apparatus manipulator can be moved in all needed directions to acquire the apparatus and apply it to a teat.

This movement of arm MA and its outer end is controlled by a suitable control apparatus, such as a specifically-arranged computer CC, responsive to a first signal (which may be several signals) from the animal position sensors, such as JS, JL, mentioned above, and to a second signal (which may be several signals) from the teat sensors, such as are described above with reference to FIGS. 7a and 7b and below, to generate control signals to operate electropneumatic valves to apply compressed air to the actuators. The response of the control apparatus is carefully arranged so that while the movement of the animal indicated by the animal position sensor is followed very closely by the milking apparatus on arm MAE, the movement of the teat indicated by the sensors associated with the milking apparatus causes only smaller, slower, movements superimposed on the animal movements. The consequent localised movements of the teat cup around the general position of the teat ensure that even large movements of the animal, which can be 15 centimeters or even more, do not risk the teat cup related sensors "losing" the teat to which it is being directed.

The manner of arranging and controlling the pneumatic devices will be readily apparent from the above to those skilled in the art for any particular arrangement of equipment. An important ability of pneumatic devices is the "soft" action mentioned above. If the pneumatic devices are sized to "yield" when subjected, for example when the animal moves, to some three or four times the effort they are intended to exert this "soft" action can be achieved.

As mentioned above the general position of the teats of an animal can be predicted and this information used to bring a teat cup closer to a teat for the final phase of application than by just using animal position information. If the actuators have suitable transducers it may be possible to derive information about teat position from the output of the transducers, to update information stored about an animal.

Figure 65:
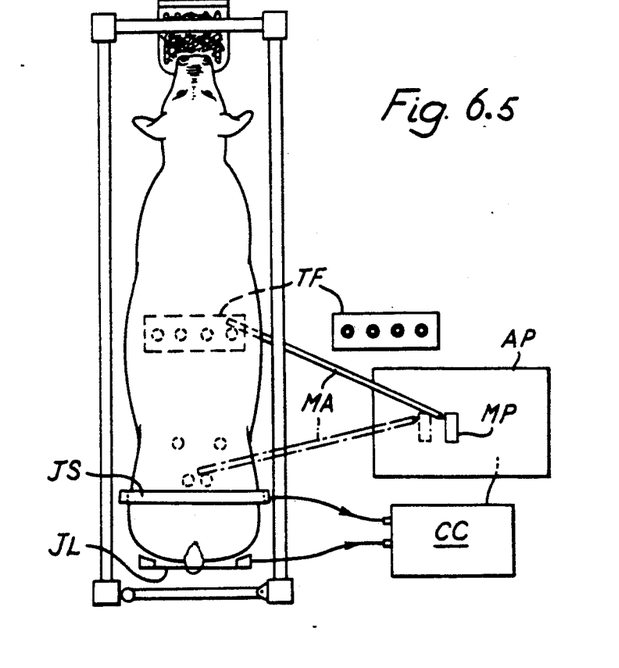

FIG. 6.5 shows how the manipulator is, in use, located next to a cattle crush. For clarity the manipulator is indicated only by the outline of the platform AP and the movable platform MP supporting the arm MA. The full line form of MP and MA shows a typical position for the collection of one or more teat cups while the dotted line form of MP and MA shows a typical position for the application of such collected teat cups to the animal to be milked, shown held in the crush.

FIG. 6.5 also shows one way in which teat cups can be offered to the manipulator. The manipulator has at end MAE a teat cup holder device, such as that shown in FIGS. 7a and 7b or as described below. The teat cups are supported in a framework TF which is displaceable from a position clear of the animal crush (full line) to a position under an animal in the crush and between the udder and the forelegs of such an animal (dotted line). When under the animal in this position one or more teat cups can be collected by the device at the end of the manipulator arm and moved, by manipulation of arm MA, to the respective teat or teats of the animal in the crush.

As mentioned above, the manipulator can be mounted on a turntable and this further, rotary, movement can be put to various uses. For example, the milking apparatus, such as individual teat cups of a quarter milker, can be at the full-line position of TF and acquired by rotating the manipulator on the turntable to move past the teat cups, acquire one or more and move on through, say, a quarter-turn to move the teat cup or cups rearwardly under the animal towards the udder. A reverse movement can return the cups to the framework TF for cleaning. An intermediate station (not shown) could be used for cleaning. In this way the manipulator arm movement range is reduced, speeding up operation as less air movement is needed in the actuators.

Arrangements to release and recover milking apparatus are also known in the art and further details will be apparent to those skilled in the art.

To increase the use of the manipulator one can be placed between two "crushes" and two quarter-milkers and associated equipment provided. The rotary movement of the manipulator permits it to apply teat cups from one milker to an animal in one crush, then from the other milker to an animal in the other crush. Considering typical milking times of about ten minutes, assuming that the rear quarter take longer to milk and that one minute is allowed for the placing of each teat cup, about twelve minutes is enough to complete one milking and the milking of the second animal can be started within five minutes of the first. This interleaved operation gives good use of the manipulator and allows time for cleaning of cups etc. as the first milking is not finished until ample time has been allowed to start the second, while the second continues long enough for washing etc. of the cups from the first milking. As the quarter milker can sense poor attachment of a teat cup the cup can be withdrawn and reattached without greatly increasing milking time.

Quarter-milkers are well-established in milking and a suitable one is the Surge machine.

Techniques for controlling the identification, admission, selection, rejection and acceptance of animals for milking are well known, as are techniques of controlled feeding, and will not be described further.

Other operating cycles based on rotation of the manipulator and moveable teat support frameworks TF will be readily apparent.

As mentioned above with reference to FIGS. 7a, 7b the teat sensor can be operated in many ways including optical devices. Another form of teat sensor is shown in outline in FIG. 8, at TS. A particularly suitable optical sensor is found in the so-called "side-looker" infra red shutter/sensor pair devices made by Sharp and known as GL480/PT480. The GL480 is a light-emitting diode operating at about 950 nanometer wavelength producing a narrow angle beam, typically ±13°, for a power dissipation of about 75 mW. The PT480 is a matching narrow angle photo transistor. It has been found that an oppositely-phased array of such devices is very effective. Conveniently six pairs of devices are used in an array TSG around a 75 millimeter square support shaped generally as an open-topped box TS with a teat cup TCC freely supported in the lower part of the "box". An emitter of one pair of the above devices is placed at the mid-point of one side of the support directed across the "box" to the sensor of the pair at the mid point of the opposite side. A similar arrangement is provided in the other two opposed sides of the "box". About 15 millimeters from each emitter is placed a sensor of another pair of devices with the respective emitter opposite and similarly 15 millimeters from the central sensor. Three parallel sensing lines thus cross the "box" at right angles to three others, all in a plane and near to the open end of the box. This "grid" is very effective at sensing the position of a teat, some 20 millimeter across, relative to the centre of the 75 millimeter square of the "box".

By suitable signal-processing circuitry responsive to the sensor outputs drive information for the manipulator arm is produced to provide "localised" movement while the animal position information provides overall movement. Typically the teat position information is five to ten times slower in response than the animal position information. Thus the "crush" information may have a response of some 20 milliseconds while the teat response is some 100 to 200 milliseconds. When the teat is found to be in the centre of the grid the "box" is raised to raise the teat cup to attach to the teat. The grid has equal fore-and-aft and side-to-side precision and being transverse to the teat is more reliable than arrangements directed upwardly at the udder or teats.

By providing a vacuum connection to the teat cup and thus drawing air down into the teat cup as the teat cup is raised toward the teat the opening of the cup is restricted and suction created in the cup, which in turn gently lifts the cup from the "box" on to the teat for good attachment. After milking the vacuum is released in the usual way.

The number of emitter sensor pairs, their spacing and the other dimensions are effective ones but more or fewer pairs, different spacing and "box" size are also possible and not excluded from the invention.

Conveniently the sensors can be arranged on a modified form of the device shown in FIGS. 7a and 7b with the "box" split along a diagonal to receive a teat cup.

A particular advantage of the teat cup being drawn from the sensor/carrier in use is that two sensor/carriers do not interfere and possibly move the teats apart unduly.

With the small, low power consumption electronic devices now available the teat sensor can be "wireless". Thus information could be conveyed by infra-red radiation or other carrier channel, as in the conventional remote control handsets now widely used, and the power required could be from electrical storage batteries incorporated in the sensor and recharged when the teat cup sensor is in the holder for washing. Techniques such as inductive charging are well-known, to avoid any electrical contacts in the electrically harsh environment of a dairy.

The arrangement and techniques thus described provide simple, robust automatic application of a milking apparatus to an animal, avoiding risk of contamination while facilitating monitoring of the udder form.

We claim:

1. An arrangement to apply a milking apparatus to the udder of an animal at a milking point including:
   a milking apparatus store,
   a handling device having an elongated arm to support and move the apparatus between an apparatus acquisition point and the milking point,
   means to define a specific space for an animal to be milked fixedly related to the acquisition point and the milking point,
   means to retain loosely in said space an animal to be milked,
   means to sense retained animal position with respect to the fixedly related space and points and provide a first control signal indicative of sensed animal position,
   a device base mechanically distinct from said means to retain loosely an animal,
   means to support the elongate arm on said base for swinging and longitudinal displacement,
   pneumatic means in said device to swing and to longitudinally displace said elongate arm about said base to acquire milking apparatus from said store and to move and position said elongate arm and any supported apparatus, and
   control means to control said pneumatic means to operate said arm to acquire milking apparatus at a position forward of the teats of a retained animal,
   said control means being responsive to said first control signal to move said acquired apparatus rearwardly and under the animal to said milking point for application to a respective teat of a retained animal,
   the arrangement further including in association with said acquired apparatus localized teat sensing means to provide a second control signal indicative of sensed teat position relative to said acquired apparatus,
   the control means being responsive also to said second control signal to control said pneumatic means for application of said acquired apparatus to a respective teat,
   the movement of the arm by the response of said control means to the second control signal being localized with respect to the response to the first control signal to enable a teat cup of said apparatus to be applied to a teat.

2. An arrangement according to claim 1 in which the store for milking apparatus is movable from a rest position outside said specific space to an apparatus acquisition position under a retained animal forward of the teats.

3. An arrangement according to claim 1 in which the localised teat sensing means is associated with an individual teat cup and the localised response moves the teat cup with respect to a sensed teat more slowly than the response to the first signal produces overall movement of the arm and supported apparatus.

4. An arrangement according to claim 1 in which the milking apparatus acquired has fewer teat cups than the number of teats of the animal to be milked.

5. An arrangement according to claim 1 to apply teat cups singly or two at a time until all are applied.

6. An arrangement according to claim 1 in which the milking apparatus includes a positioner for each teat cup, and in which each positioner includes a pneumatic actuator operable to hold a teat cup already positioned with respect to the positioner or to release the teat cup.

7. An arrangement according to claim 1 in which the milking apparatus includes for each positioner a teat cup support means having a pneumatic actuator operable to hold with respect to said teat cup support means a teat cup body already positioned or to release the body in the support means.

8. An arrangement according to claim 7 in which the teat cup support means is coupled to the positioner to be held thereby with a cup positioned or to be released by said positioner actuator.

9. An arrangement according to claim 1 including drive means operable to allow the apparatus to revert, at least partially under gravity, to a defined relaxation position where each teat cup sets to a zero position.

10. An arrangement according to claim 1 in which the pneumatic device includes an assembly of relatively movable elements pivoted for movement by pneumatic actuators to produce at least said movement of the milking apparatus rearwardly and under the animal and to drive the device with respect to a said teat cup held at a fixed point by a holding means and otherwise released from constraint to adjust the setting of said elements.

11. An arrangement according to claim 1 in which the fixed space includes means to track the movement of a retained animal and the arrangement includes means responsive to the means to track the animal to drive the pneumatic means to follow the animal with a degree of freedom.

12. An arrangement according to claim 1 in which the localised teat sensing means is free of wired connections.

13. An arrangement according to claim 1 including drive means operable to drive the apparatus from the defined relaxation position to an operating position with each teat cup set to a zero position ready for setting to a relationship appropriate to an expected position of the teats of the animal.

14. A method of applying a milking apparatus to the udder of an animal including:
providing an adjustable pneumatic milking apparatus support device,
positioning the device on a mechanically distinct base,
positioning forwardly of the device said milking apparatus,
positioning alongside the device and the milking apparatus an animal to be milked,
loosely restraining said animal,
acquiring the milking apparatus with the device,
moving the acquired milking apparatus supported on the device under the animal to approach the front of the udder for the application of the milking apparatus.

15. An apparatus for applying a milking device to the udder of an animal at a milking site comprising:
means defining a specific space for receiving an animal to be milked;
means for loosely retaining an animal to be milked in said specific space;
a milking device;
means for storing said milking device remote from said specific space;
sensor means for sensing a position of an animal with respect to said means defining a specific space, said means for storing, and said milking site and for providing a first control signal indicative of the sensed animal position;
a handling device for supporting and moving said milking device from said means for storing to the milking site, said handling device being mounted to a base, said handling device and said base being mechanically distinct from said means for loosely retaining an animal,
said handling device comprising an elongated arm, said elongated arm being supported on said base for pivotal and longitudinal displacement;
pneumatic means for pivoting and longitudinally displacing said elongated arm relative to said base so as to retrieve said milking device from said means for storing and to move and position said elongated arm and milking device supported thereby; and
control means for controlling said pneumatic means to operate said elongate arm to disposed said milking device at a position forward of the teats of an animal retained in said specific space;
said control means being responsive to said first control signal to move said milking device rearwardly and under an animal retained in said specific space to said milking site for application to a respective teat of the animal;
localized teat sensing means operatively associated with said milking device for providing a second control signal representative of a sensed teat position relative to said milking device, said control means being further responsive to said second control signal to control said pneumatic means so as to apply said milking device to a respective teat, movement of the elongate arm by said control means in response to said second control signal being localized with respect to movement in response to said first control signal whereby a teat cup of said milking device can be applied to a teat.

* * * * *